(12) United States Patent
Khairallah et al.

(10) Patent No.: US 11,433,480 B2
(45) Date of Patent: Sep. 6, 2022

(54) ADDITIVE MANUFACTURING POWER MAP TO MITIGATE OVERHANG STRUCTURE

(71) Applicant: LAWRENCE LIVERMORE NATIONAL SECURITY, LLC, Livermore, CA (US)

(72) Inventors: Saad A. Khairallah, Livermore, CA (US); Gabe Guss, Manteca, CA (US); Wayne E. King, Danville, CA (US); Manyalibo Joseph Matthews, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 385 days.

(21) Appl. No.: 16/152,763

(22) Filed: Oct. 5, 2018

(65) Prior Publication Data

US 2019/0291209 A1 Sep. 26, 2019

Related U.S. Application Data

(60) Provisional application No. 62/647,358, filed on Mar. 23, 2018.

(51) Int. Cl.
*B23K 26/04* (2014.01)
*B23K 26/34* (2014.01)
(Continued)

(52) U.S. Cl.
CPC ............ *B23K 26/34* (2013.01); *B23K 26/354* (2015.10); *B33Y 10/00* (2014.12); *B33Y 30/00* (2014.12); *B33Y 50/02* (2014.12)

(58) Field of Classification Search
CPC ............ B22F 2003/1058; B22F 3/1055; B22F 2003/1056; B22F 2003/1057; B23K 26/34;
(Continued)

(56) References Cited

U.S. PATENT DOCUMENTS 5,787,965 A * 8/1998 Sterett .................... B33Y 30/00
164/155.3
2014/0197140 A1 7/2014 Unrath
(Continued)

FOREIGN PATENT DOCUMENTS

| CN | 104999079 A | 10/2015 |
| EP | 3127635 A1 | 2/2017 |
| WO | 2007-079361 A2 | 7/2007 |

OTHER PUBLICATIONS

International Search Report and Written Opinion for PCT/US2019/023470 corresponding to U.S. Appl. No. 16/152,763, 8 pages.

*Primary Examiner* — Sang Y Paik
(74) *Attorney, Agent, or Firm* — Eddie E. Scott (57) ABSTRACT

A laser powder bed fusion additive manufacturing system for producing a part by creating a power map that is an intelligent feed forward model to control the laser powder bed fusion additive manufacturing for producing the part and using the power map to control the laser powder bed fusion additive manufacturing for producing the part. This includes an apparatus for producing a part including a powder bed, a laser that produces a laser beam, a proportional integral derivative controller that creates a power map that describes laser power requirements as the laser moves along a path, wherein the laser power requirements prevent defects in the part.

8 Claims, 5 Drawing Sheets

(51) Int. Cl.
*B33Y 10/00* (2015.01)
*B23K 26/354* (2014.01)
*B33Y 50/02* (2015.01)
*B33Y 30/00* (2015.01)

(58) Field of Classification Search
CPC .............. B23K 26/354; B23K 15/0013; B23K 15/0086; B23K 15/02; B23K 26/0643; B23K 26/0648; B23K 26/0732; B23K 26/0736; B23K 26/0738; B23K 26/342; B23K 26/702; B33Y 10/00; B33Y 30/00; B33Y 50/02; B28B 17/0081; B28B 1/001; B29C 64/153; B29C 64/393; B29K 2105/251; G02B 27/0911; Y02P 10/25; Y02P 10/295
USPC .......................................... 219/121.6–121.83
See application file for complete search history.

(56) References Cited

U.S. PATENT DOCUMENTS

| | | | |
|---|---|---|---|
| 2015/0087082 A1* | 3/2015 | Iyer ....................... | B23K 26/352 438/5 |
| 2015/0331402 A1 | 11/2015 | Lin et al. | |
| 2016/0046077 A1* | 2/2016 | Yadroitsau ............. | B29C 64/153 264/40.1 |
| 2018/0099333 A1* | 4/2018 | DehghanNiri ........ | B22F 3/1055 |
| 2018/0322621 A1* | 11/2018 | Craeghs ............... | B23K 26/342 |

* cited by examiner

ADDITIVE MANUFACTURING POWER MAP TO MITIGATE OVERHANG STRUCTURE

CROSS-REFERENCE TO RELATED APPLICATIONS

This application claims priority to and benefit under 35 U.S.C. § 119(e) of U.S. Provisional Patent Application No. 62/647,358 filed Mar. 23, 2018 entitled "additive manufacturing power map to mitigate overhang structure," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to Additive Manufacturing: Power map to mitigate overhang structure.

State of Technology

This section provides background information related to the present disclosure which is not necessarily prior art.

The challenge is to build an overhang structure using AM, without formation of dross. That is how to maintain a smooth surface at the overhang. These overhang structures can differ in build quality from machine to machine due to the randomness of the dross process.

There is no prior art other than trial and error, and still, this does not produce optimal overhang structure.

The inventors' method uses Intelligent Feed Forward principle by employing an additive manufacturing power map an PID loop within a computational simulation. This helps maintain a constant melt pool depth, by automatically monitoring the laser energy deposition. Hence, since dross is equivalent to randomly produced melt depth that exceeds the accepted roughness threshold, the PID controls the amount of melt depth and keeps it in control, constant, hence avoiding wild fluctuations (dross) and help keep the surface smooth.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors' apparatus, systems and methods provide an intelligent feed forward model to control additive manufacturing (AM) laser powder bed fusion process, whereby, the laser crosses an overhang section and creates a smooth overhand inner walls, with little to no dross formation. This is accomplished by controlling the laser power through a computer model. The description below describes using a proportional integral derivative (PID) controller to create a power map. The benefit of the process map is to eliminate dross formation in overhangs built using AM. These rough surface defects are random in nature. Their presence prevent machine to machine reproducibility of same AM parts. Also, they have a deleterious effect on part properties. Removing them is a major need and requirement for future AM machines.

The inventors' apparatus, systems and methods have use in additive manufacturing machines that use energy beams to create AM parts for any application.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors have developed an intelligent feed forward model to control additive manufacturing (AM) laser powder bed fusion process, whereby, the laser crosses an overhang section and creates a smooth overhand inner walls, with little to no dross formation. This is accomplished by controlling the laser power through a computer model. The Applicants will describe using a proportional integral derivative (PID) controller to create a power map. The benefit of the process map is to eliminate dross formation in overhangs built using AM. These rough surface defects are random in nature. Their presence prevent machine to machine reproducibility of same AM parts. Also, they have a deleterious effect on part properties. Removing them is a major need and requirement for future AM machines. The inventor's apparatus, systems and methods will be used in additive manufacturing machines that use energy beams to create AM parts for any application.

Figure 1:
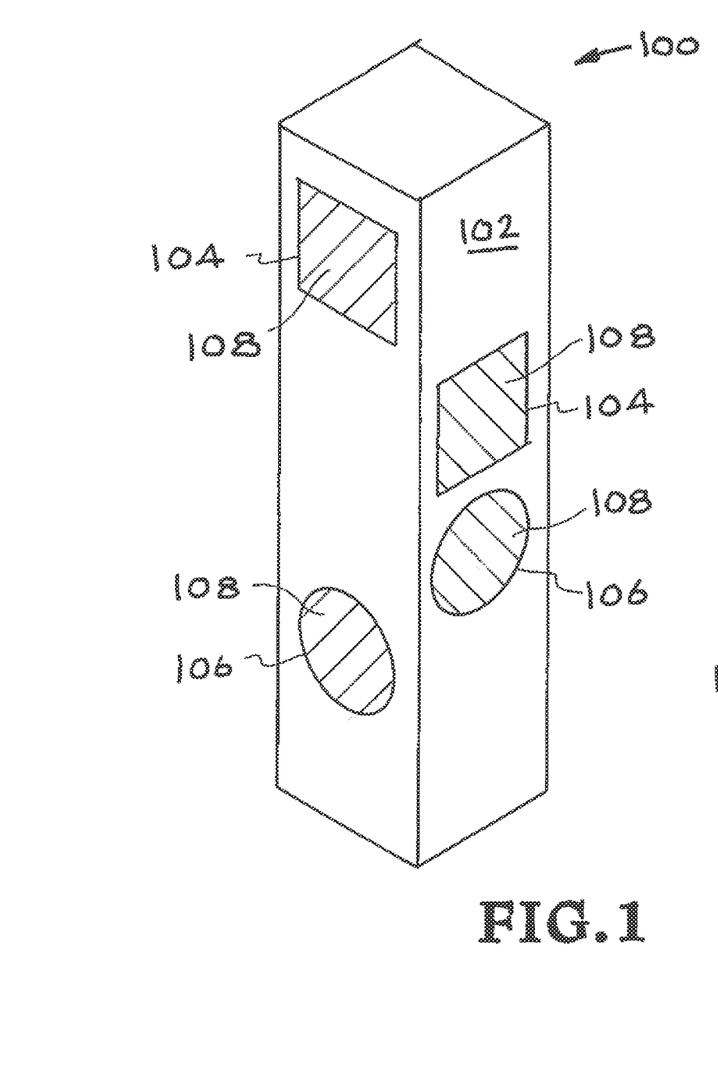
FIG. 1 illustrates an object constructed using an AM and using a first material and a second material.
Figure 2:
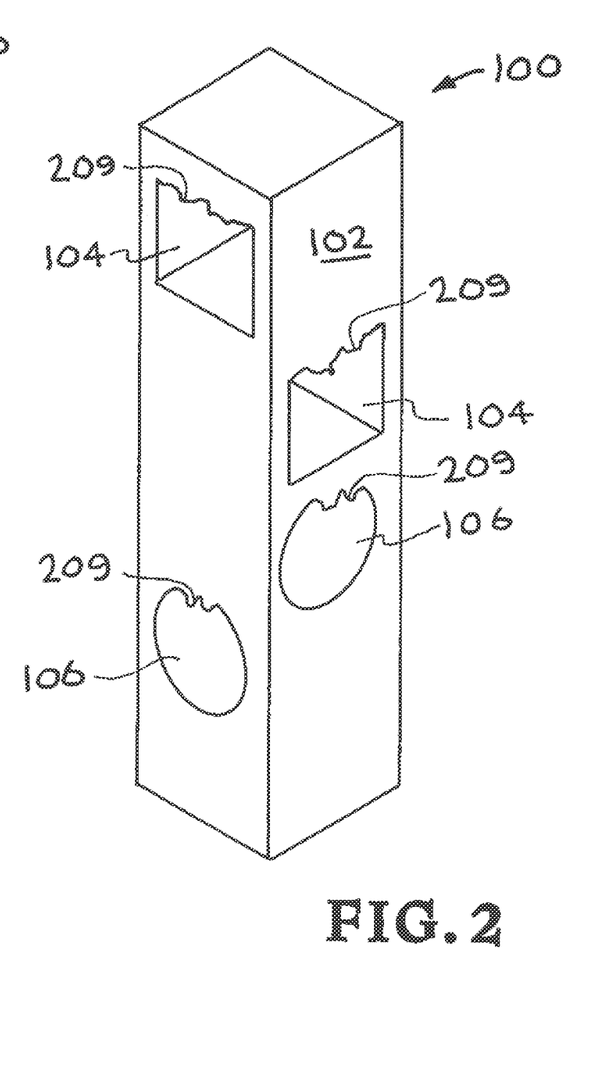
FIG. 2 is a simplified schematic depiction further illustrating the object constructed using an AM.

Referring now to the drawings and in particular to FIG. 1 and FIG. 2, simplified schematic depictions illustrates an object constructed using an AM. FIGS. 1 and 2 will be used to demonstrate dross formation in overhangs. FIG. 1 illustrates an object constructed using an AM and using a first material and a second material. As illustrated, the depiction in FIG. 1 includes a number of components. The components illustrated in FIG. 1 are identified and described below.

Reference Numeral 100—Object.
Reference Numeral 102—The part of object 100 consisting of a first material.
Reference Numeral 104—Simple square openings features to be built into object 100.
Reference Numeral 106—Simple round holes features to be built into object 100.
Reference Numeral 108—Bridging material of made of a second material used in the AM of object 100.

Referring now to FIG. 2, a simplified schematic depiction further illustrates the object 100 constructed using an AM and helps demonstrate dross formation in overhangs. The components illustrated in FIG. 2 are identified and described below.

Reference Numeral 100—Object.
Reference Numeral 102—The part of object 100 consisting of a first material.
Reference Numeral 104—Simple square openings features to be built into object 100.
Reference Numeral 106—Simple round holes features to be built into object 100.
Reference Numeral 209—Dross or overhang that can occur during AM constructing of a desired object.

The description of the components illustrated in FIG. 2 having been completed, the operational aspects of constructing the object 100 using an AM system that incorporates the inventor's apparatus, systems and methods will now be considered. The bridging material 108 has been etched/removed leaving the features 104 and 106 exposed. A common problem encountered is that dross or overhang 209 can occur. Dross or overhang 209 is shown in the features 104 and 106.

Figure 3:
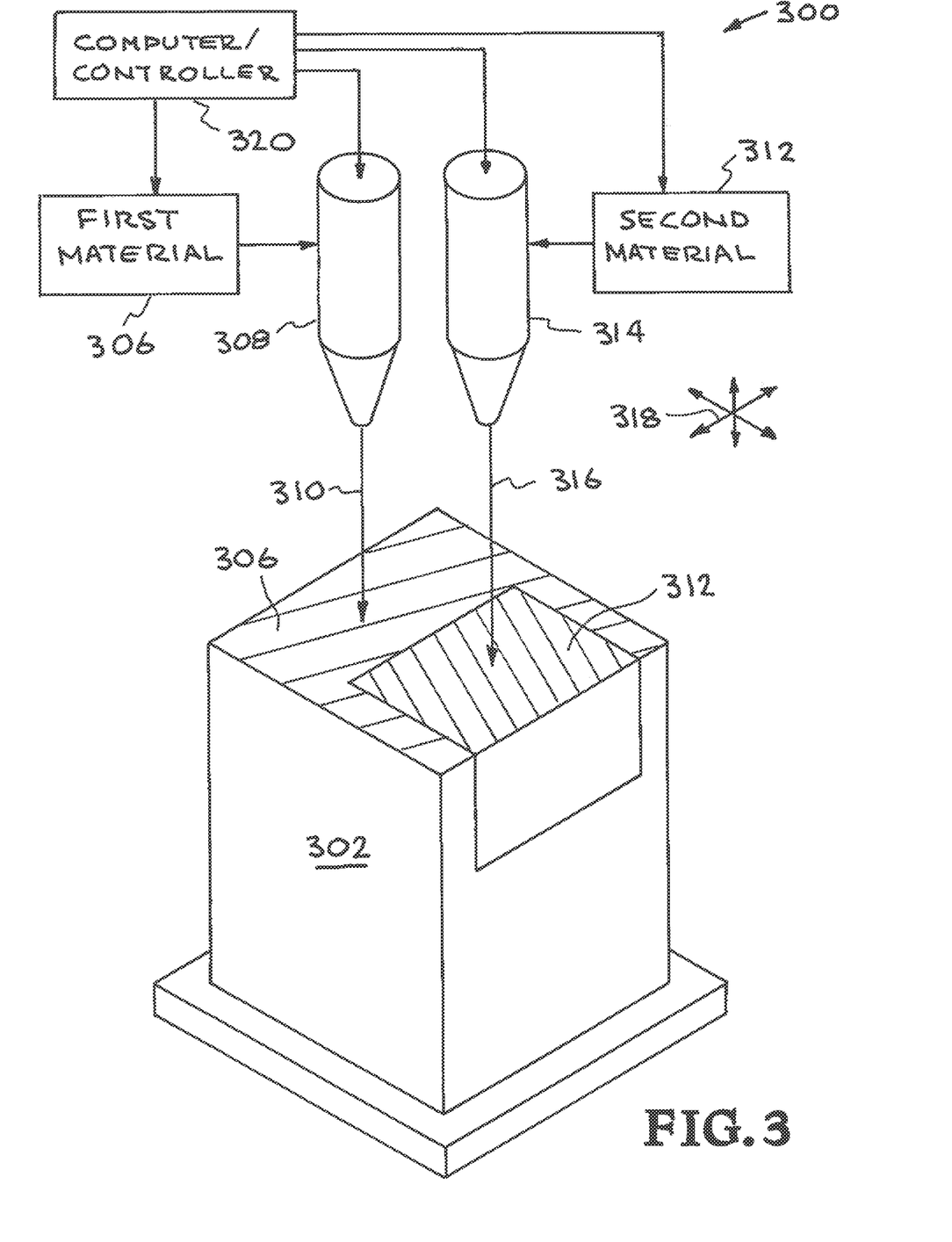
FIG. 3 is a simplified illustration showing the construct of an object using an AM system and a first material and a second material.

Referring now to FIG. 3, a simplified illustration shows the construct of an object using an using an AM system with a first material and a second material. The components illustrated in FIG. 3 are identified and described below.

Reference Numeral 300—System for constructing an object.
Reference Numeral 302—Object.
Reference Numeral 304—Build platform.
Reference Numeral 306—First material.
Reference Numeral 308—First printhead.
Reference Numeral 310—First material stream.
Reference Numeral 312—Second material.
Reference Numeral 314—Second printhead.
Reference Numeral 316—Second material stream.
Reference Numeral 318—Arrows indicating possible movement directions for print heads 308 and 314.
Reference Numeral 320—Computer/Controller.

The system 300 for constructing an object is an AM system for producing an object 302. The part 306 of the object 302 is constructed of the first material 306. One or more features made of the second material 312 are included in the object 302.

The system 300 incudes a build platform 304, a first printhead 308, and a second printhead 314. A first material 306 is directed into the first printhead 308 and is extruded from the first printhead 308 in a first material stream 310 to produce the part 306 of the object 302. A second material 312 is directed into the second printhead 314 and is extruded from the second printhead 314 in a second material stream 316 to produce the feature made of the second material 312. Relative movement between the build platform 304 and the first and second printhead 308 and 314 is illustrated by the arrows 318. A computer/controller 320 directs operation of the system 300 to produce the object 302.

Figure 4:
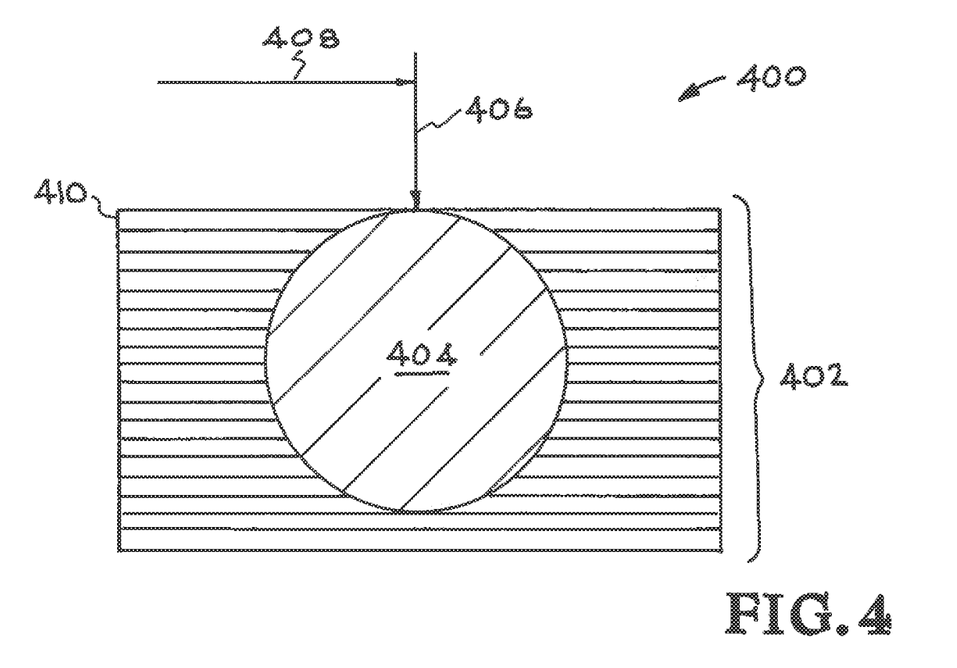
FIG. 4 illustrates an object constructed using AM.
Figure 5:
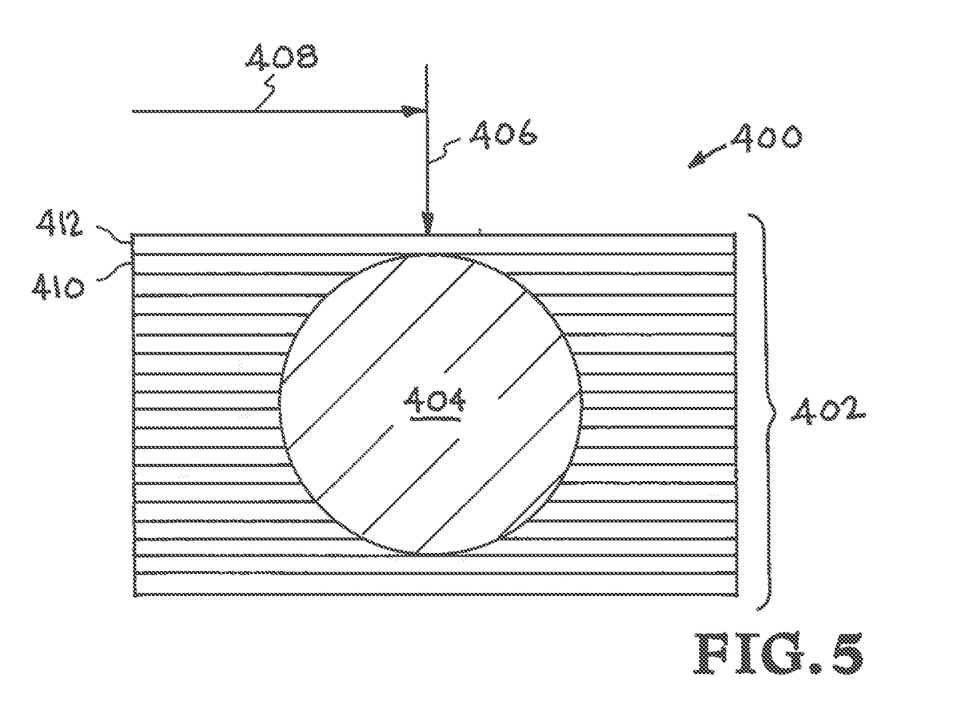
FIG. 5 illustrates the object being constructed using AM.
Figure 6:
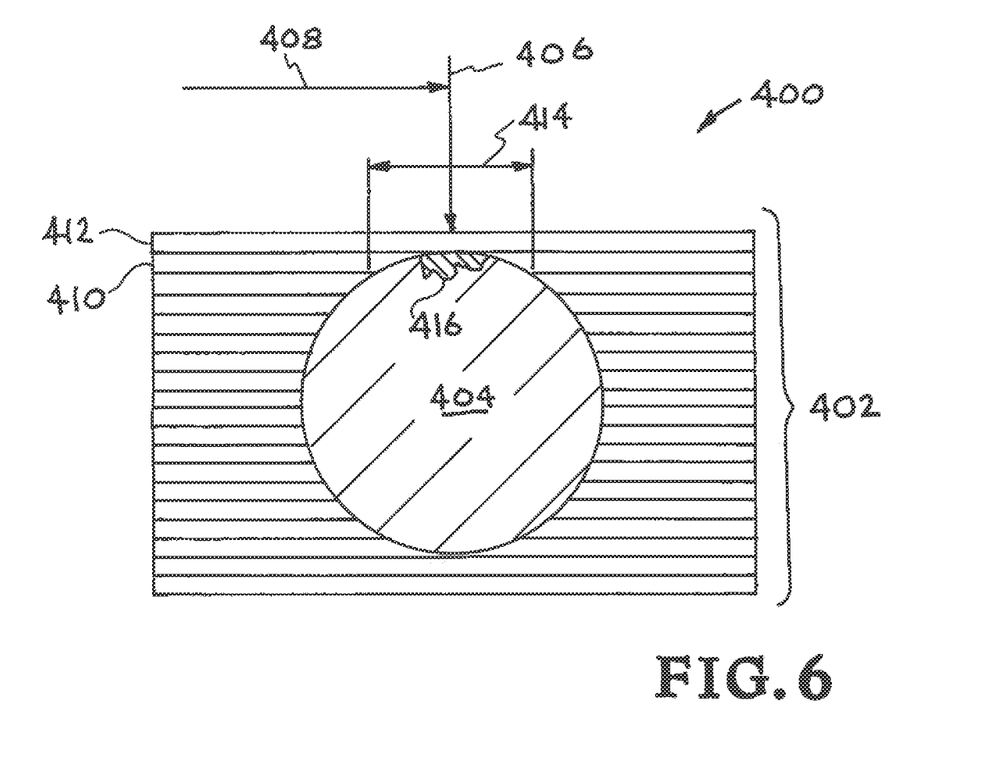
FIG. 6 illustrates the object being constructed using AM with illustration of dross formation in an overhang.

Referring now to FIGS. 4, 5, and 6; illustrations will be used to further demonstrate dross formation in overhangs. FIG. 4 illustrates an object constructed using an AM. The components illustrated in FIG. 4 are identified and described below.

Reference Numeral 400—Object.
Reference Numeral 402—Layers of melted powder.
Reference Numeral 404—Layers of bridging material made of a second material.
Reference Numeral 406—Laser beam.
Reference Numeral 408—Laser beam path.
Reference Numeral 410—A single layer of the layers of melted powder 402.

FIG. 4 illustrates a moment in time in the AM construction of the object 400. In FIG. 4 an object 400 being made of a first material and a second material is shown. The first material is the layers of melted powder 402. The second material is the layers of the bridging material 404. The second material 404 will eventually be removed to complete the final workpiece/object 400. Note that for simplicity only the overall second material 404 is shown and the individual layers of the second material do not appear.

The laser beam 406 moves along the laser beam path 408 to melt the metal powder and form the solidified layers of the object 400. FIG. 4 illustrates a moment in time in the AM construction of the object 400 when the single layer 410 has been applied. The layers of the first material 402 and the layers of the second bridging material 404 have been laid down.

Referring now to FIG. 5 the object 400 being constructed using an AM is illustrated. The components illustrated in FIG. 5 are identified and described below.

Reference Numeral 400—Object.
Reference Numeral 402—Layers of melted powder.
Reference Numeral 404—Layers of bridging material made of a second material.
Reference Numeral 406—Laser beam.
Reference Numeral 408—Laser beam path.
Reference Numeral 410—A single layer of the layers of melted powder 402.

Reference Numeral 412—An additional layer of the layers of melted powder 402.

FIG. 5 illustrates another moment in time in the AM construction of the object 400. In FIG. 5 the object 400 being made of a first material and a second material is shown. The first material is the layers of melted powder 402. The second material is the layers of the bridging material 404. The second material 404 will eventually be removed to complete the final workpiece/object 400. Note that for simplicity only the overall second material 404 is shown and the individual layers of the second material do not appear. In FIG. 5 an additional layer 412 of melted powder is shown being applied on top of the layer 410.

The laser beam 406 moves along the laser beam path 408 to melt the metal powder and form the solidified layers of the object 400. FIG. 5 illustrates another moment in time in the AM construction of the object 400 when the layers of the first material 402 including the single layer 410 and the layers of the second bridging material 404 have been laid down. FIG. 5 shows the additional layer 412 of melted powder being applied on top of the layer 410.

Referring now to FIG. 6 the object 400 being constructed using an AM is shown with illustration of dross formation in an overhang. The components illustrated in FIG. 6 are identified and described below.
Reference Numeral 400—Object.
Reference Numeral 402—Layers of melted powder.
Reference Numeral 404—Layers of bridging material made of a second material.
Reference Numeral 406—Laser beam.
Reference Numeral 408—Laser beam path.
Reference Numeral 410—A single layer of the layers of melted powder 402.
Reference Numeral 412—An additional layer of the layers of melted powder 402.
Reference Numeral 414—An area where the laser beam power remains constant.
Reference Numeral 416—Dross/overhang 416.

FIG. 6 illustrates and further demonstrates dross formation in an overhang. In FIG. 6 the object 400 being made of a first material and a second material is shown. The first material is the layers of melted powder 402. The second material is the layers of the bridging material 404. The second material 404 will eventually be removed to complete the final workpiece/object 400. Note that for simplicity only the overall second material 404 is shown and the individual layers of the second material do not appear. In FIG. 6 an additional layer 412 of melted powder has been applied on top of the layer 410.

In each pass 408 of the laser beam 406 in the areas outside of area 414 the beam 406 not only melts/fuses the additional layer 412, the laser beam 406 also fuses the layer 412 to the layer 410 below layer 412. If the laser beam power remains constant in the area labeled 414, too much energy will be applied. This leads to melting into the bridge material 40 and the formation of dross/overhang 416 that will remain after removal of the bridging material in a later step of the AM process. FIG. 6 shows dross/overhang 416 extending into the second bridging material 404. This dross/overhang 416 will remain after removal of the bridging material 404 in a later step of the AM process.

The inventor's additive manufacturing power map mitigates overhang defects by reducing the laser power as the laser beam moves along the area labeled 414. A tracer point can be used by a PID controller. By requesting the temperature variable at that point to be equal to melting temperature, the PID controller will control the power to achieve this end.

The inventors' apparatus, systems and methods provide a solution to the problem illustrated in FIGS. 4, 5, and 6. The inventors additive manufacturing power map mitigates overhang structures. The inventors additive manufacturing power map uses an intelligent feed forward model to control additive manufacturing (AM) laser powder bed fusion process, whereby, the laser crosses an overhang section and creates a smooth overhand inner walls, with little to no dross formation. This is accomplished by controlling the laser power through a computer model. A proportional integral derivative (PID) controller creates a power map. The benefit of the process map is to eliminate dross formation in overhangs built using AM. These rough surface defects are random in nature. Their presence prevent machine to machine reproducibility of same AM parts. Also, they have a deleterious effect on part properties. Removing them is a major need and requirement for future AM machines.

Figure 7:
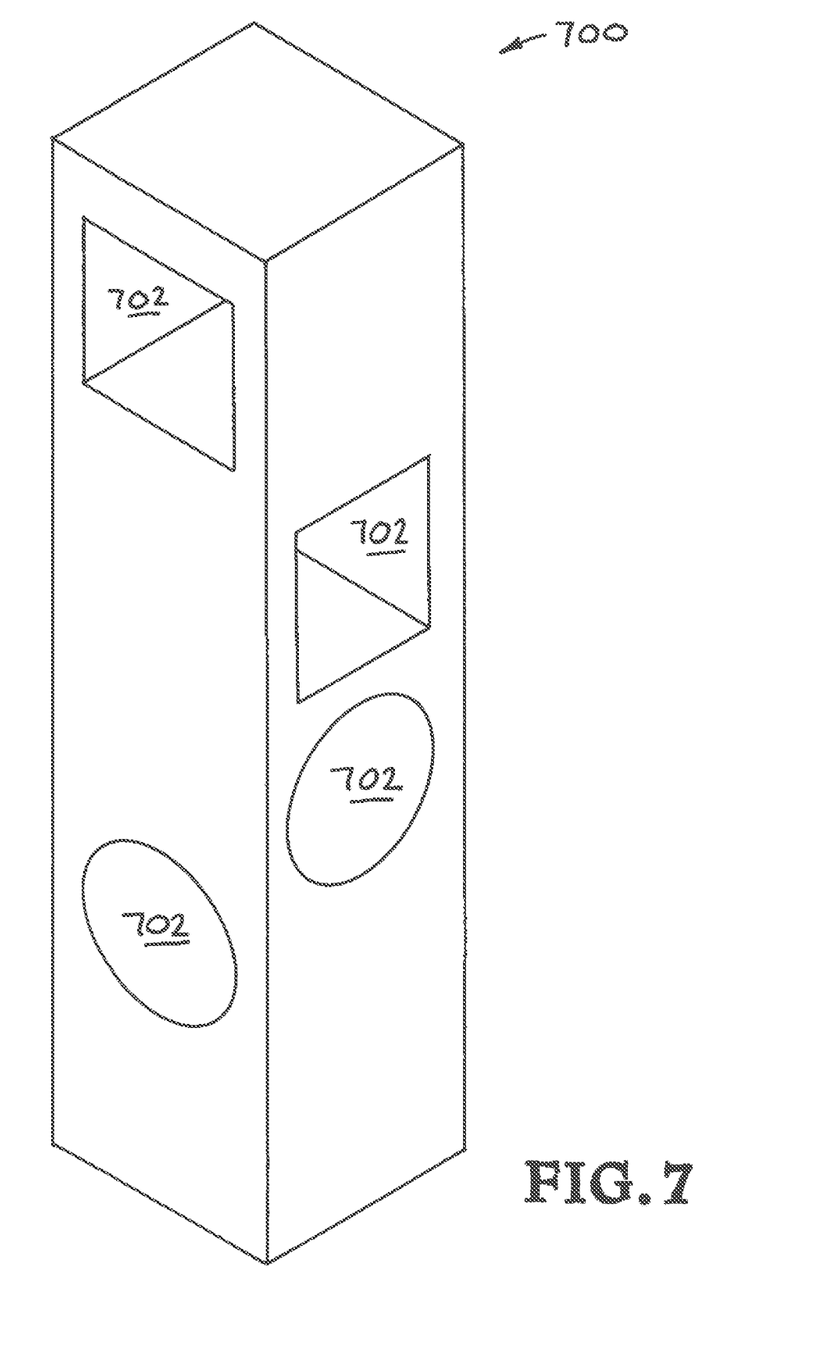
FIG. 7 illustrates the final finished workpiece/object constructed using AM and the inventors' power map apparatus, systems and methods.

Referring now to FIG. 7, an illustration shows the final finished workpiece/object 700 constructed using an AM and the inventors' power map apparatus, systems and methods. The components illustrated in FIG. 7 are identified and described below.
Reference Numeral 700—Finished workpiece/object.
Reference Numeral 702—Simple square openings and round hole features built into finished workpiece/object 700.

The powder bed fusion system includes an apparatus in which selected areas of a powder bed are solidified in a layer-by-layer manner to form a workpiece. A laser generates a laser beam across the surface of the powder bed to solidify predetermined areas of each layer. Applicants' AM power map mitigates defects when the laser follows a laser path that produces a laser beam path on the powder bed.

The inventors' power map system utilizes the PID (proportional integral derivative) to decrease the laser power and maintain a constant melt depth. Since the energy is accumulating in overhang region, the temperature at the tracer point is maintained fixed. The PID then controls the power by decreasing it, so as to decrease the amount of energy deposited and maintain a constant temperature value at the depth of the tracer point. This in turns guarantees fixed melt pool depth and prevents formation of dross.

Additional details of the inventors' inventors additive manufacturing power map are disclosed in the patent applications identified and described below. The content of the patent applications identified and described below are hereby incorporated herein by reference in their entirety for all purposes.

U.S. Provisional Patent Application No. 62/647,358 filed Mar. 23, 2018 entitled "additive manufacturing power map to mitigate overhang structure."

U.S. Provisional Patent Application No. 62/647,375 filed Mar. 23, 2018 entitled "additive manufacturing power map to mitigate defects."

U.S. patent application Ser. No. 16/145,483 filed Sep. 28, 2018 entitled "additive manufacturing power map to mitigate defects."

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A laser powder bed fusion additive manufacturing control method for producing a workpiece wherein dross formation in overhangs can occur during the laser powder bed fusion additive manufacturing, comprising the steps of:
   providing a first material;
   providing a second material wherein the second material is a bridging material;
   providing a laser that produces a laser beam;
   using said first material, second material, said laser, and said laser beam to produce an intermediate workpiece unit having a body made of said first material and features in said body wherein said features are made of said second material;
   providing a proportional integral derivative controller;
   providing a tracer point operatively connected to said proportional integral derivative controller;
   creating a power map to prevent formation of said dross formation in overhangs in said first material of said workpiece wherein said power map is an intelligent feed forward model;
   using said power map, said proportional integral derivative controller, and said tracer point to control said laser and said laser beam and produce said intermediate workpiece unit having a body made of said first material and features in said body wherein said features are made of said second material;
   using said power map, said proportional integral derivative controller, and said tracer point to prevent formation of said dross formation in overhangs in said first material; and
   removing said features made of said second material from said body made of said first material to produce said workpiece wherein there is no dross formation in overhangs in said first material.

2. The laser powder bed fusion additive manufacturing control method for producing a workpiece of claim 1 wherein said step of creating a power map includes using said proportional integral derivative controller and said tracer point to create said power map.

3. The laser powder bed fusion additive manufacturing control method for producing a workpiece of claim 1 wherein said step of creating a power map includes using a proportional integral derivative controller and said tracer point to predict laser power requirements to achieve melt pool characteristics that prevent formation of said dross formation in overhangs.

4. The laser powder bed fusion additive manufacturing control method for producing a workpiece of claim 1 wherein said step of creating a power map includes using said proportional integral derivative controller to predict laser power requirements to achieve melt pool characteristics that eliminated defects in the part by controlling the laser power through a computer model.

5. The laser powder bed fusion additive manufacturing control method for producing a workpiece of claim 1 wherein said step of creating a power map includes using said proportional integral derivative controller and said tracer point to provide a closed control loop system to predict laser power requirements to achieve melt pool characteristics that prevent formation of said dross formation in overhangs.

6. The laser powder bed fusion additive manufacturing control method for producing a workpiece of claim 1 wherein said step of using said power map to control said laser and said laser beam and produce said intermediate workpiece unit includes the step of creating said tracer point in a computer model.

7. The laser powder bed fusion additive manufacturing control method for producing a workpiece of claim 6 wherein said step of creating said tracer point in a computer model includes the step of using said tracer point in a computer model to control said laser and said laser beam and produce said intermediate workpiece unit.

8. An additive manufacturing apparatus for producing a workpiece wherein dross formation in overhangs can occur during the additive manufacturing, comprising:
   a first material;
   a second material wherein the second material is a bridging material;
   a laser that produces a laser beam;
   means for using said first material, second material, said laser, and said laser beam to produce an intermediate workpiece unit having a body made of said first material and features in said body wherein said features are made of said second material;
a proportional integral derivative controller;
a tracer point operatively connected to said proportional integral derivative controller;
means for creating a power map to prevent formation of dross in said first material of said workpiece wherein said power map is an intelligent feed forward model uses said proportional integral derivative controller and said tracer point;
means for using said power map, said proportional integral derivative controller, and said tracer point to control said laser and said laser beam and produce said intermediate workpiece unit having a body made of said first material and features in said body wherein said features are made of said second material;
means for using said power map, said proportional integral derivative controller, and said tracer point to prevent formation of said dross formation in overhangs in said first material; and
means for removing said features made of said second material from said body made of said first material to produce said workpiece wherein there is no dross formation in overhangs in said first material.

* * * * *